No. 11,889. Reissued Feb. 12, 1901.

J. G. McMILLAN.

BRIDGE OR WHARF FLOOR CONSTRUCTION.

(Application filed Oct. 23, 1900.)

Witnesses,

E. A. Brandau

J. H. Morse

Inventor,

John G. McMillan,

By Dewey & Strong Co.

Attys

UNITED STATES PATENT OFFICE.

JOHN G. McMILLAN, OF SAN JOSE, CALIFORNIA.

BRIDGE OR WHARF FLOOR CONSTRUCTION.

SPECIFICATION forming part of Reissued Letters Patent No. 11,889, dated February 12, 1901.

Original No. 617,471, dated January 10, 1899. Application for reissue filed October 23, 1900. Serial No. 34,097.

*To all whom it may concern:*

Be it known that I, JOHN GILMORE McMILLAN, a citizen of the United States, residing at San José, county of Santa Clara, State of California, have invented an Improvement in Bridge or Wharf Floor Constructions; and I hereby declare the following to be a full, clear, and exact description of the same.

My invention relates to improvements in the construction of floors for bridges, wharves, and other structures requiring a floor that will resist a great amount of wear; and it consists, essentially, of lengths of timber laid upon supporting joists or girders or upon any suitable timber-work, the strips to be spiked together in continuous succession and to be alternately of a greater and less height, so as to form channels between for the reception of the asphalt or cement surface, which is afterward placed thereon and which forms the wearing-surface of the structure.

Figure 1:
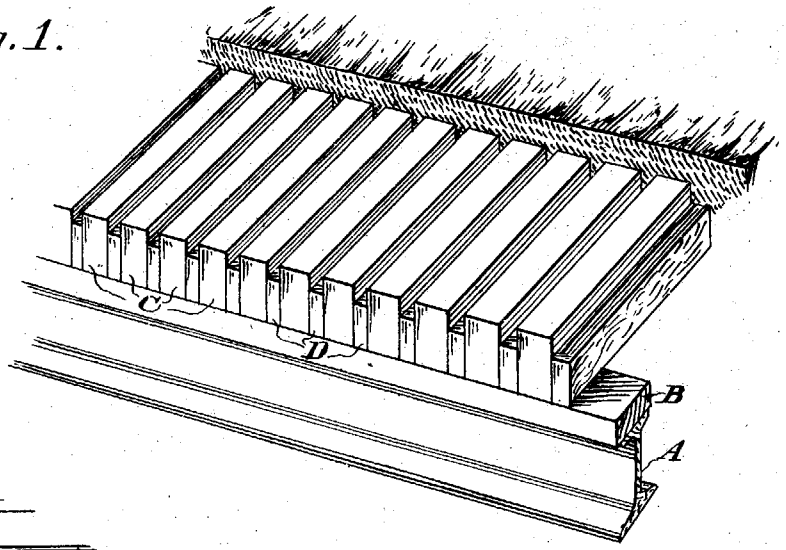
Figure 2:
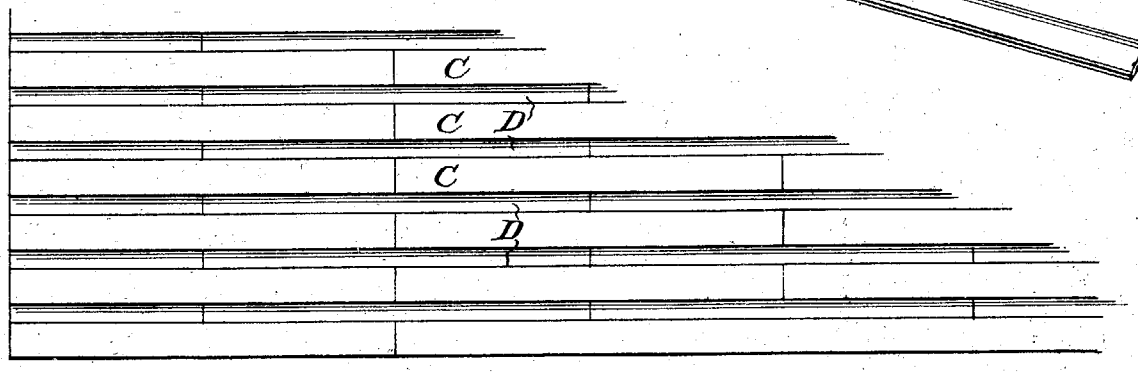

Referring to the accompanying drawings, Figure 1 is a general view showing the construction. Fig. 2 is a plan view of the timber-work.

In the usual construction of bridges, wharves, and other structures, over which travel passes, if the plank surface is exposed to wear it is very soon destroyed and must be frequently replaced, and if it is attempted to cover this surface with cement, asphalt, or other good wearing protective substance it is soon broken up and destroyed by the spring of the plank composing the floor, so that any surface of this sort which is employed soon becomes broken, disintegrated, and useless.

The object of my invention is to provide a solid continuous floor adapted to receive such a surface and so channeled as to form a lock by which the covering material is united with the floor and becomes an integral part of it.

The floor is composed of main timber C, which are made of any suitable height, depth, and thickness that may be necessary to support the required load. Intermediate between these timbers are fixed the longitudinal timbers D, which are made of less height, and these are solidly nailed or spiked together, so as to form a continuous structure with the longitudinal grooves or channels between the main timbers.

In the present case A represents a transverse beam or girder, and B are timbers resting thereon and beveled or declining from the center to the sides to provide the proper crown.

The channels may be rectangular, as shown, or the sides of the main timbers may be formed near the top, so that the channels are slightly dovetail in shape to increase the efficiency of the lock for the surface compound.

The timbers may be laid so as to break joints, and the structure when secured together forms a tight unyielding floor. The surface is then completed by a covering of cement, artificial stone, asphalt, or other suitable material for a wearing-surface, which may be laid of any desired thickness, and it will fill the longitudinal channels, the surface being level or prepared any way to make a foothold for horses or otherwise form a suitable surface for travel. A floor thus constructed being unyielding, the wearing-surface will not be cracked or broken, and the whole structure is practically a unit.

Having thus described my invention, what I claim as new, and desire to secure by Letters Patent, is—

1. A floor for bridges and wharves, consisting of beams, transverse to the floor, forming sills, timbers laid on edge, with intermediate timbers of less height secured thereto and forming channels, said timbers and intermediate timbers secured directly together in continuous succession from one portion of the floor to the other to form a rigid inseparable structure, and a plastic covering spread over the surface and filling said channels.

2. A floor for bridges consisting of supporting-beams made higher in the center than at each end, longitudinal timbers laid on edge upon said floor-beams with intermediate timbers of less height rigidly secured thereto and forming longitudinal channels, said timbers and intermediate timbers being laid and secured together in continuous succession from one portion of the floor to the other, and a plastic covering spread over the surface and filling said channels substantially as described.

3. A floor structure consisting of primary supports, timbers laid on edge thereon, with intermediate timbers of less height secured thereto to form channels between the higher timbers, said first-named timbers and the intermediate timbers being laid and secured together in continuous succession substantially from one portion of the structure to the other, and a plastic covering spread over the surface filling said channels.

In witness whereof I have hereunto set my hand.

JOHN G. McMILLAN.

Witnesses:

ALFRED A. ENQUIST,

S. H. NOURSE.